A. J. COMPTON.
VEHICLE SPRING LUBRICATOR.
APPLICATION FILED NOV. 20, 1920.
1,427,071.  Patented Aug. 22, 1922.
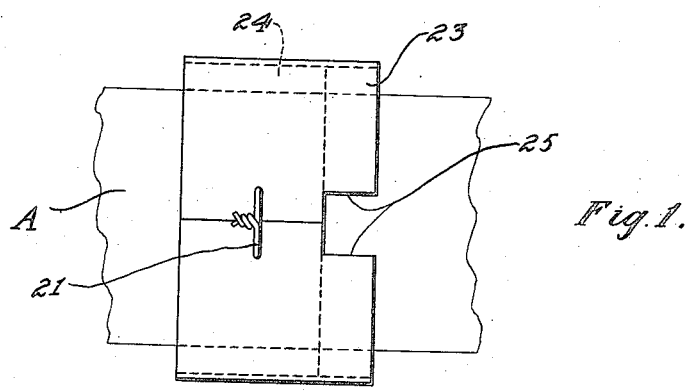
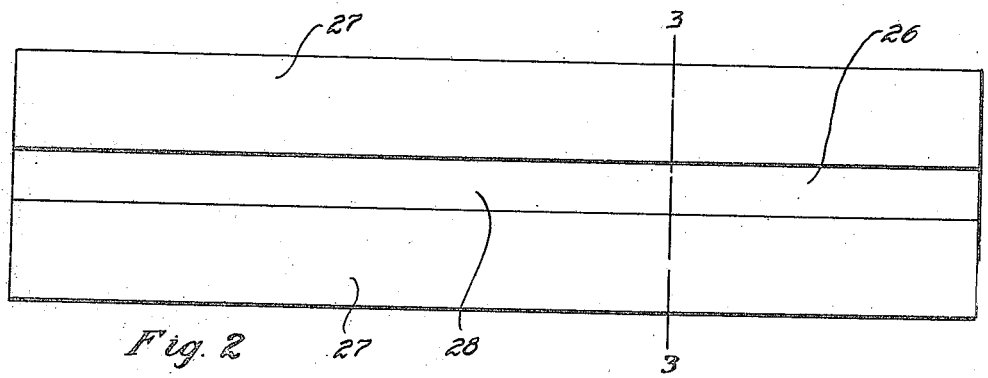
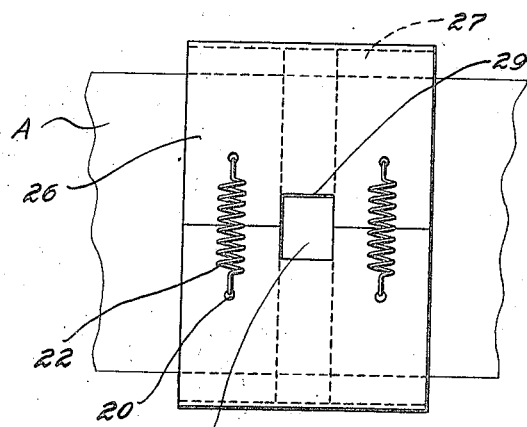
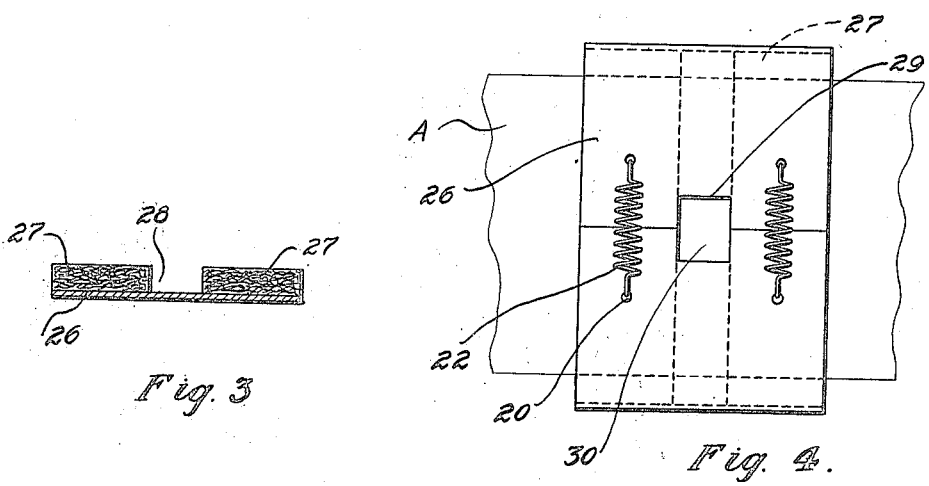
A. J. Compton.
INVENTOR

UNITED STATES PATENT OFFICE.

ANDREW J. COMPTON, OF TRENTON, NEW JERSEY.

VEHICLE SPRING LUBRICATOR.

1,427,071.

Specification of Letters Patent. Patented Aug. 22, 1922.

Application filed November 20, 1920. Serial No. 425,421.

*To all whom it may concern:*

Be it known that I, ANDREW J. COMPTON, a citizen of the United States, residing at Trenton, in the county of Mercer and State of New Jersey, have invented new and useful Improvements in Vehicle Spring Lubricators, of which the following is a specification.

This invention relates to lubricating devices for the springs of automobiles or other vehicles and has for its object the provision of a metallic strip or body to which is suitably secured absorbent material designed to be saturated with oil, the device being wrapped about the vehicle spring with the saturated material disposed against the spring and the ends being secured so that as the spring moves when encountering inequalities in the road the oil will be squeezed out and will enter between the leaves of the spring so as to effect thorough lubrication thereof.

An important object is the provision of lubricating means of this character which may be manufactured in the form of a strip of sheet metal having one or more strips of felt or the like cemented or otherwise secured thereto, it being intended that the strip as a whole be cut into sections of the proper length whereby a section may be wrapped about the spring to be lubricated.

Another object is the provision of a device of this character in which the absorbent strips may be in spaced relation to define a channel terminating in notches at the ends of the device, this arrangement facilitating refilling or resaturation of the felt strips with oil after they have once become dry.

An additional object is the provision of lubricating means of this character which will be very simple and inexpensive, highly efficient and positive in operation, and a general improvement in the art.

With the above and other objects and advantages in view, the invention consists in the details of construction to be hereinafter more fully described and claimed and illustrated in the accompanying drawings in which—

Figure 1 is a plan view of my device applied to a vehicle spring, a fragment only of the spring being shown, Figure 2 is a view of the device flattened out preparatory to being used and showing a slightly modified form, Figure 3 is a cross section taken on the line 3—3 of Figure 2 and Figure 4 is a plan view of another modified form.

Referring more particularly to the drawings the letter A designates a fragment of a vehicle spring upon which my lubricating device is applied. In carrying out my invention I provide a metal strip 23 against the inner side of which is secured a strip of felt 24 which is of less width than the strip so that a portion of the latter will overhang. Two corners of the strip are cut away as indicated at 25 so that when the strip is wrapped about the spring as shown in Figure 1 these cut away portions will mate to define a rectangular notch or opening into which oil may be poured from an oil can or the like for the purpose of saturating the felt. The ends of the strip are here illustrated, that is in Figure 1, as secured together by means of a piece of wire 21 which is passed through holes in the strip and which has its ends subsequently twisted together.

In Figures 2, 3, and 4 I have shown another modification. In this form the numeral 26 designates the metallic strip which is relatively wide and upon which are secured spaced felt strips 27 which define a channel 28 between them. This strip is applied to the spring in the same manner as the previously described forms but is designed particularly for use on heavy springs such as employed in trucks and the like. The ends of the section may be secured together either by the tie wires shown in Figure 10 or by means of coil springs, as shown in Figure 13. At the ends of the section are provided notches 29 which mate to form an opening 30 which leads into the channel between the felt strips whereby the channel may be filled with oil.

In all forms of the invention it will be seen that the principle is the same, the variation in the different forms being merely in the details, and it will be apparent that all forms are very easily applied and will efficiently operate to effect thorough lubrication of vehicle springs.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A lubricating device for vehicle springs comprising a strip of sheet metal, a strip of absorbent material secured thereon, the assembled strips being adapted to be bent about a vehicle spring in conforming engagement and the absorbent material being adapted for saturation by a lubricant, one edge of the absorbent strip being spaced from the edge of the metallic strip whereby to define a channel, the ends of the metallic strip being cut away to define an opening leading into said channel.

2. A lubricating device comprising a strip of pliable material adapted to be bent into encircling engagement upon a vehicle spring, a pair of strips of absorbent material secured upon said strip and spaced apart whereby to define a channel, and the ends of the first mentioned strips being notched to form an opening leading into the channel.

3. A spring leaf lubricator comprising an elongated strip of flexible material adapted to be bent into encircling relation to springs of a vehicle, absorbent material upon the inner surface of the strip, and coil springs connected with the ends of the strip whereby to hold the same in encircling relation to the spring, the uppermost portion of the strip being formed with a cut-away portion permitting the pouring of oil onto the absorbent material whereby to saturate the same.

In testimony whereof I affix my signature.

ANDREW J. COMPTON.